United States Patent
Yamamoto et al.

(10) Patent No.: US 10,642,119 B2
(45) Date of Patent: May 5, 2020

(54) ELECTROCHROMIC COMPOUND, ELECTROCHROMIC COMPOSITION, AND ELECTROCHROMIC ELEMENT

(71) Applicants: Satoshi Yamamoto, Kanagawa (JP); Toshiya Sagisaka, Kanagawa (JP); Masato Shinoda, Kanagawa (JP); Daisuke Goto, Kanagawa (JP)

(72) Inventors: Satoshi Yamamoto, Kanagawa (JP); Toshiya Sagisaka, Kanagawa (JP); Masato Shinoda, Kanagawa (JP); Daisuke Goto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/585,201

(22) Filed: May 3, 2017

(65) Prior Publication Data
US 2017/0336691 A1    Nov. 23, 2017

(30) Foreign Application Priority Data
May 18, 2016 (JP) .................. 2016-099914

(51) Int. Cl.
| C09K 11/06 | (2006.01) |
| G02F 1/153 | (2006.01) |
| C09K 9/02 | (2006.01) |
| G02F 1/1516 | (2019.01) |

(52) U.S. Cl.
CPC ............... *G02F 1/153* (2013.01); *C09K 9/02* (2013.01); *C09K 2211/1029* (2013.01); *C09K 2211/1044* (2013.01); *G02F 1/15165* (2019.01)

(58) Field of Classification Search
CPC combination set(s) only.
See application file for complete search history.

(56) References Cited

U.S. PATENT DOCUMENTS

| 7,781,588 B1 * | 8/2010 | Wang ............... C07D 219/08 546/102 |
| 2014/0268284 A1 | 9/2014 | Naijo et al. |
| 2015/0198857 A1 | 7/2015 | Yashiro et al. |
| 2015/0274761 A1 | 10/2015 | Sagisaka et al. |
| 2015/0331295 A1 | 11/2015 | Takahashi et al. |
| 2016/0005375 A1 | 1/2016 | Naijo et al. |
| 2016/0108072 A1 | 4/2016 | Inoue et al. |
| 2016/0209721 A1 | 7/2016 | Matsumoto et al. |
| 2017/0010514 A1 | 1/2017 | Yashiro et al. |

FOREIGN PATENT DOCUMENTS

| CN | 105330611 | 2/2016 |
| JP | 55-149374 | 11/1980 |
| JP | 08-225532 | * 9/1996 |
| JP | 8-225532 | 9/1996 |
| JP | 9-512041 | 12/1997 |
| JP | 2005-220095 | 8/2005 |
| JP | 2012-515732 | 7/2012 |
| KR | WO2006041263 | * 4/2006 |
| KR | 10-2012-0083242 | 7/2012 |
| KR | 10-2013-0075949 | 7/2013 |
| KR | 10-2013-0118269 | 10/2013 |
| WO | WO95/028495 A1 | 10/1995 |
| WO | WO2010/083871 A1 | 7/2010 |

OTHER PUBLICATIONS

U.S. Appl. No. 15/315,103, filed Nov. 30, 2016.
U.S. Appl. No. 15/502,367, filed Feb. 7, 2017.
U.S. Appl. No. 15/315,970, filed Jun. 30, 2015.
Mei Li et al., "Highly contrasted and stable electrochromic device based on well-matched viologen and triphenylamine," Organic Electronics 15 (2014) 428-434 available online Dec. 3, 2013.
U.S. Appl. No. 15/375,824, filed Dec. 12, 2016.
Trisha I Andrew, et al., "Detection of Explosive Via Photolytic Cleavage of Nirtoesters and Nitramines", The Journal of Organic Chemistry, 2011, pp. 2976-2993.
Ernst Sturm, et al., Elektrochemische Oxidantion Von Acridanen, Chem. Ber. 111, pp. 227-239 (1978).

* cited by examiner

*Primary Examiner* — Monique R Peets
(74) *Attorney, Agent, or Firm* — Oblon, McClelland, Maier & Neustadt, L.L.P.

(57) ABSTRACT

An electrochromic compound represented by the following formula (I) is provided:

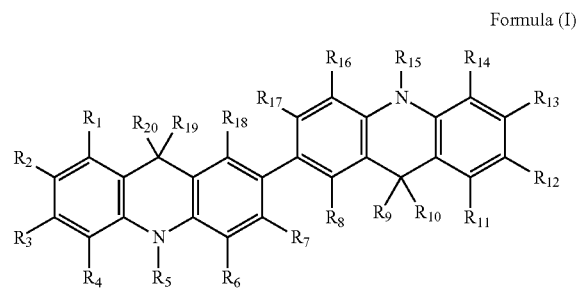

Formula (I)

where each of $R_1$ to $R_8$ and $R_{11}$ to $R_{18}$ independently represents any one of a hydrogen atom, a halogen atom, a monovalent organic group, the monovalent organic group having a substituent, a polymerizable functional group, and the polymerizable functional group having a substituent; and each of $R_9$, $R_{10}$, $R_{19}$, and $R_{20}$ independently represents any one of a hydrogen atom, an alkyl group, and an aryl group.

12 Claims, 2 Drawing Sheets

ELECTROCHROMIC COMPOUND, ELECTROCHROMIC COMPOSITION, AND ELECTROCHROMIC ELEMENT

CROSS-REFERENCE TO RELATED APPLICATIONS

This patent application is based on and claims priority pursuant to 35 U.S.C. § 119(a) to Japanese Patent Application No. 2016-099914, filed on May 18, 2016, in the Japan Patent Office, the entire disclosure of which is hereby incorporated by reference herein.

BACKGROUND

Technical Field

The present disclosure relates to an electrochromic compound, an electrochromic composition, and an electrochromic element.

Description of the Related Art

Electrochromism is the phenomenon displayed by some materials of reversibly changing color as a redox reaction reversibly occurs in the materials in response to a voltage. Electrochromism is displayed when a redox reaction occurs in an electrochromic element that includes a pair of electrodes facing each other and an ion-conductive electrolyte layer disposed between the electrodes. A reduction reaction occurs in proximity to one of the electrodes, and an oxidization reaction (i.e., the reverse reaction of the reduction reaction) occurs in proximity to the other one of the electrodes.

To apply such an electrochromic element to a transparent display device or a color developing device in which cyan, magenta, and yellow color developing layers are laminated, the electrochromic element needs to be made of a material that can become colorless and transparent.

SUMMARY

In accordance with some embodiments of the present invention, an electrochromic compound is provided. The electrochromic compound is represented by the following formula (I):

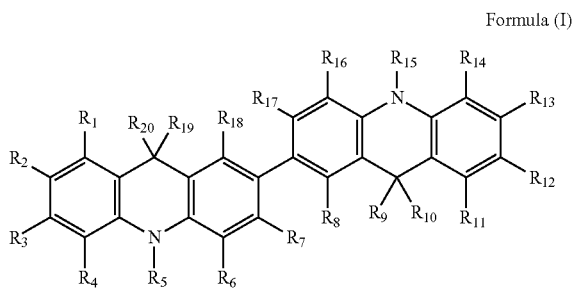

Formula (I)

where each of $R_1$ to $R_8$ and $R_{11}$ to $R_{18}$ independently represents any one of a hydrogen atom, a halogen atom, a monovalent organic group, the monovalent organic group having a substituent, a polymerizable functional group, and the polymerizable functional group having a substituent; and each of $R_9$, $R_{10}$, $R_{19}$, and $R_{20}$ independently represents any one of a hydrogen atom, an alkyl group, and an aryl group.

In accordance with some embodiments of the present invention, an electrochromic composition is provided. The electrochromic composition includes the above electrochromic compound and a polymerizable compound.

In accordance with some embodiments of the present invention, an electrochromic element is provided. The electrochromic element includes a first electrode, a second electrode, an electrolyte disposed between the first electrode and the second electrode, and the above electrochromic compound.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
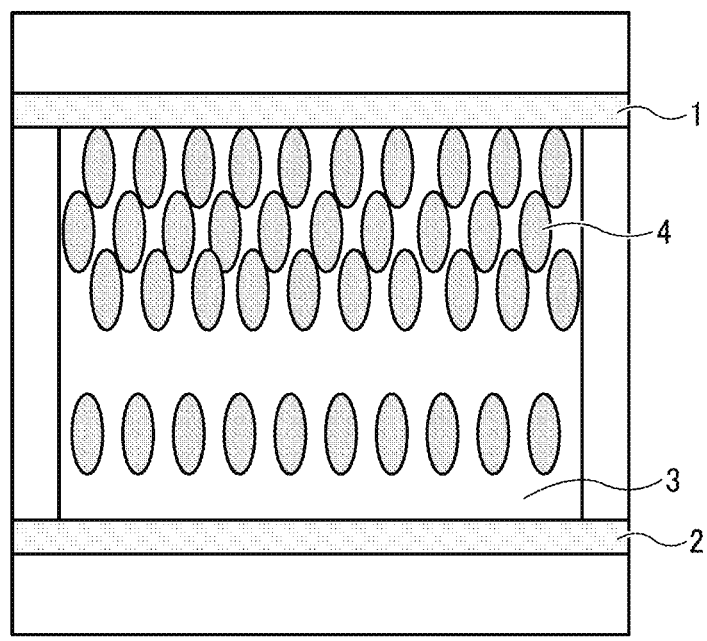
FIG. 1 is a schematic cross-sectional view of an electrochromic element according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an electrochromic compound is provided that has stable operation property and excellent yellow color developing ability.

Electrochromic Compound

An electrochromic compound according to an embodiment of the present invention is represented by the following formula (I).

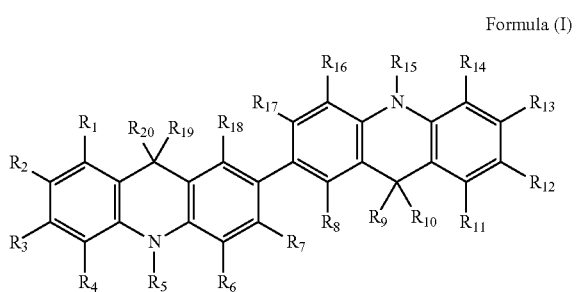

Formula (I)

In the formula (I), each of $R_1$ to $R_8$ and $R_{11}$ to $R_{18}$ independently represents a hydrogen atom, a halogen atom, a monovalent organic group, or a polymerizable functional group. The monovalent organic group and/or the polymerizable functional group may have a substituent.

Each of $R_9$, $R_{10}$, $R_{19}$, and $R_{20}$ independently represents a hydrogen atom, an alkyl group, or an aryl group.

The preset invention is achieved based on the findings by the inventors of the present invention that there is no conventionally-used material that develops brilliant yellow or magenta color. As an example, triphenylamine materials are known to develop blue, cyan, or green color, and benzidine materials are known to develop orange color.

The inventors of the present invention have studied various materials that develop yellow color by electrochromism. As a result, the bis(acridan) compound represented by the formula (I) is found to be suitable as an electrochromic material for developing yellow color.

There has been reported that some materials having a bis(acridan) backbone are used as light-emitting materials but no material having a bis(acridan) backbone is used as an electrochromic material.

Specific examples of the halogen atom for $R_1$ to $R_8$ and $R_{11}$ to $R_{18}$ in the formula (1) include, but are not limited to, fluorine atom, chlorine atom, bromine atom, and iodine atom.

Monovalent Organic Group

Specific examples of the monovalent organic group for $R_1$ to $R_8$ and $R_{11}$ to $R_{18}$ in the formula (1) include, but are not limited to, hydroxyl group, nitro group, cyano group, carboxyl group, carbonyl group, amide group, aminocarbonyl group, sulfonic acid group, sulfonyl group, sulfonamide group, aminosulfonyl group, amino group, alkyl group, alkenyl group, alkynyl group, aryl group, alkoxy group, aryloxy group, alkylthio group, arylthio group, and heteroaryl group. The monovalent organic group may have a substituent.

Preferably, the monovalent organic group is selected from an alkyl group, alkenyl group, alkynyl group, aryl group, heteroaryl group, alkoxy group, aryloxy group, or heteroaryloxy group, because they are redox-resistant.

Preferably, the monovalent organic group for $R_2$ and $R_{12}$ is selected from an alkyl group, alkenyl group, alkynyl group, aryl group, heteroaryl group, alkoxy group, aryloxy group, or heteroaryloxy group, because they are redox-resistant.

Specific examples of the monovalent organic group which may have a substituent further include, but are not limited to: carbonyl groups which may have a substituent (e.g., alkoxycarbonyl group which may have a substituent, aryloxycarbonyl group which may have a substituent, alkylcarbonyl group which may have a substituent, arylcarbonyl group which may have a substituent, monoalkylaminocarbonyl group which may have a substituent, dialkylaminocarbonyl group which may have a substituent, monoarylaminocarbonyl group which may have a substituent, diarylaminocarbonyl group which may have a substituent); sulfonyl groups which may have a substituent (e.g., alkoxysulfonyl group which may have a substituent, aryloxysulfonyl group which may have a substituent, alkylsulfonyl group which may have a substituent, arylsulfonyl group which may have a substituent, sulfoneamide group, monoalkylaminosulfonyl group which may have a substituent, dialkylaminosulfonyl group which may have a substituent, monoarylaminosulfonyl group which may have a substituent, diarylaminosulfonyl group which may have a substituent); alkylamino groups which may have s substituent (e.g., monoalkylamino group which may have a substituent, dialkylamino group which may have a substituent); alkyl groups which may have a substituent; alkenyl groups which may have a substituent; alkynyl groups which may have a substituent; aryl groups which may have a substituent; alkoxy groups which may have a substituent; aryloxy groups which may have a substituent; alkylthio groups which may have a substituent; arylthio groups which may have a substituent; and heteroaryl group which may have a substituent.

Among the above groups, alkyl groups having 1 or more carbon atoms, alkenyl groups having 2 or more carbon atoms, alkynyl groups having 2 or more carbon atoms, aryl groups having 6 or more carbon atoms, heteroaryl groups having 2 or more carbon atoms, alkoxy groups, aryloxy groups, and heteroaryloxy groups are preferable.

Preferred examples of the alkyl groups having 1 or more carbon atoms include, but are not limited to, straight-chain, branched-chain, or cyclic alkyl groups having 1 to 30 carbon atoms, more preferably 1 to 18 carbon atoms, from the aspect of material availability.

Specific examples of the alkyl groups having 1 or more carbon atoms include, but are not limited to, methyl group, ethyl group, propyl group, butyl group, isopropyl group, isobutyl group, pentyl group, hexyl group, heptyl group, ethylhexyl group, octyl group, decyl group, dodecyl group, 2-butyloctyl group, octadecyl group, cyclopropyl group, cyclobutyl group, cyclopentyl group, cyclohexyl group, and adamantyl group.

Preferred examples of the alkenyl groups having 2 or more carbon atoms include, but are not limited to, straight-chain, branched-chain, or cyclic alkenyl groups having 2 to 30 carbon atoms, more preferably 2 to 18 carbon atoms.

Specific examples of the alkenyl groups having 2 or more carbon atoms include, but are not limited to, the above-exemplified alkyl groups having 1 or more carbon atoms from which two hydrogen atoms have been removed, such as vinyl group (ethenyl group), propenyl group, butenyl group, pentenyl group, hexenyl group, heptanyl group, octenyl group, decenyl group, dodecenyl group, octadecenyl group, cyclobutenyl group, cyclopentenyl group, and cyclohexenyl group.

Preferred examples of the alkynyl groups having 2 or more carbon atoms include, but are not limited to, straight-chain, branched-chain, or cyclic alkynyl groups having 2 to 30 carbon atoms, more preferably 2 to 18 carbon atoms.

Specific examples of the alkynyl groups having 2 or more carbon atoms include, but are not limited to, the above-exemplified alkyl groups having 1 or more carbon atoms from which four hydrogen atoms have been removed, such as ethynyl group, propynyl group, butynyl group, pentynyl group, hexynyl group, heptynyl group, octynyl group, decynyl group, dodecynyl group, and octadecynyl group.

Preferred examples of the aryl groups having 6 or more carbon atoms include, but are not limited to, aryl groups having 6 to 18 carbon atoms.

Specific examples of the aryl groups having 6 or more carbon atoms include, but are not limited to, phenyl group, o-tolyl group, m-tolyl group, p-tolyl group, p-chlorophenyl group, p-fluorophenyl group, p-trifluorophenyl group, naphthyl group, biphenyl group, anthryl group, phenanthryl group, and pyrenyl group.

Preferred examples of the heteroaryl groups having 2 or more carbon atoms include, but are not limited to, heteroaryl groups having 2 to 12 carbon atoms.

The heteroaryl groups having 2 or more carbon atoms may include nitrogen atom, sulfur atom, oxygen atom, silicon atom, and/or selenium atom. Preferably, at least one of nitrogen atom, sulfur atom, and oxygen atom is included therein.

Examples of the heteroaryl groups having 2 or more carbon atoms further include monocyclic heteroaryl groups and polycyclic heteroaryl groups.

Specific examples of monocyclic heteroaryl groups include, but are not limited to, pyridine ring, pyrimidine ring, pyridazine ring, pyrazine ring, tetrazine, thiophene ring, furan ring, pyrrole, imidazole, pyrazole, thiazole ring, oxazole ring, isoxazole, oxadiazole ring, triazine ring, tetrazole ring, and triazole ring.

Specific examples of polycyclic heteroaryl groups include, but are not limited to, quinoline group, isoquinoline group, quinazoline group, phthalazine group, indole group, benzothiophene group, benzofuran group, benzimidazole group, benzothiadiazole group, acridine group, phenoxazine group, phenothiazine group, carbazole group, benzodithiophene group, and benzodifuran group.

Polymerizable Functional Group

The polymerizable functional group for $R_1$ to $R_8$ and $R_{11}$ to $R_{18}$ in the formula (1) is defined as a radical polymerizable functional group having a carbon-carbon double bond.

Preferably, at least one of $R_5$ and $R_{15}$ in the formula (1) is the polymerizable functional group because it is redox-resistant.

Specific examples of the polymerizable functional group include, but are not limited to, 1-substituted ethylene functional groups and 1,1-substituted ethylene functional groups.

Specific examples of the 1-substituted ethylene functional groups include, but are not limited to, a functional group represented by the following formula (i).

$CH_2=CH-X_1-$     Formula (i)

In the formula (i), $X_1$ represents a substituted or unsubstituted arylene group, a substituted or unsubstituted alkenylene group, —CO— group, —COO— group, or —CON($R_{100}$)— group (where $R_{100}$ represents a hydrogen atom, an alkyl group, an aralkyl group, or an aryl group), or —S— group.

Specific examples of the arylene group in the formula (i) include, but are not limited to, a substituted or unsubstituted phenylene group and naphthylene group.

Specific examples of the alkenylene group in the formula (i) include, but are not limited to, ethenylene group, propenylene group, and butenylene group.

Specific examples of the alkyl group in the formula (i) include, but are not limited to, methyl group and ethyl group.

Specific examples of the aralkyl group in the formula (i) include, but are not limited to, benzyl group, naphthylmethyl group, and phenethyl group.

Specific examples of the aryl group in the formula (i) include, but are not limited to, phenyl group and naphthyl group.

Specific examples of the polymerizable functional group represented by the formula (i) include, but are not limited to, vinyl group, styryl group, 2-methyl-1,3-butadienyl group, vinyl carbonyl group, acryloyloxy group, acryloylamide group, and vinyl thioether group.

Specific examples of the 1,1-substituted ethylene functional groups include, but are not limited to, a functional group represented by the following formula (ii).

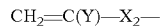
$CH_2=C(Y)-X_2-$     Formula (ii)

In the formula (ii), Y represents a substituted or unsubstituted alkyl group, a substituted or unsubstituted aralkyl group, a substituted or unsubstituted aryl group, a halogen atom, cyano group, nitro group, an alkoxy group, or —COOR$_{101}$ group (where R$_{101}$ represents a hydrogen atom, a substituted or unsubstituted alkyl group, a substituted or unsubstituted aralkyl group, a substituted or unsubstituted aryl group, or CONR$_{102}$R$_{103}$ (where each of R$_{102}$ and R$_{103}$ independently represents a hydrogen atom, a substituted or unsubstituted alkyl group, a substituted or unsubstituted aralkyl group, or a substituted or unsubstituted aryl group)). $X_2$ represents a substituent, such as those exemplified for $X_1$ in the formula (i), a single bond, or an alkylene group. At least one of Y and $X_2$ represents oxycarbonyl group, cyano group, an alkenylene group, or an aromatic ring.

Specific examples of the aryl group in the formula (ii) include, but are not limited to, phenyl group and naphthyl group.

Specific examples of the alkyl group in the formula (ii) include, but are not limited to, methyl group and ethyl group.

Specific examples of the alkoxy group in the formula (ii) include, but are not limited to, methoxy group and ethoxy group.

Specific examples of the aralkyl group in the formula (i) include, but are not limited to, benzyl group, naphthylmethyl group, and phenethyl group.

Specific examples of the polymerizable functional group represented by the formula (ii) include, but are not limited to, α-acryloyloxy chloride group, methacryloyloxy group, α-cyanoethylene group, α-cyanoacryloyloxy group, α-cyanophenylene group, and methacryloyl amino group.

$X_1$, $X_2$, and Y may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Preferably, the polymerizable functional group is composed of a polymerizable substituent and a spacer. The polymerizable substituent may be, for example, acryloyloxy group, methacryloyloxy group, acryloyl group, methacryloyl group, a vinyl group. In particular, acryloyloxy group and methacryloyloxy group are preferred as the polymerizable substituent. The spacer, preferably, has a structure including at least one of an alkyl group, an aryl group, and an alkyl-group-substituted aryl group, because they are highly resistant to redox reactions. Thus, for example, the polymerizable functional group may have a partial structure including an alkyl group having 1 or more carbon atoms, an aryl group having 6 or more carbon atoms, or an alkyl-group-substituted aryl group having 7 or more carbon atoms.

In a case in which the partial structure (spacer) includes the alkyl group or the alkyl-group-substituted aryl group, preferably, the polymerizable substituent is bound to one end of the alkyl group, and more preferably, the alkyl group has at least 2 carbon atoms.

Specific examples of such polymerizable functional groups include, but are not limited to, the following functional groups. Dotted lines represent binding sites to the main backbone of the electrochromic compound.

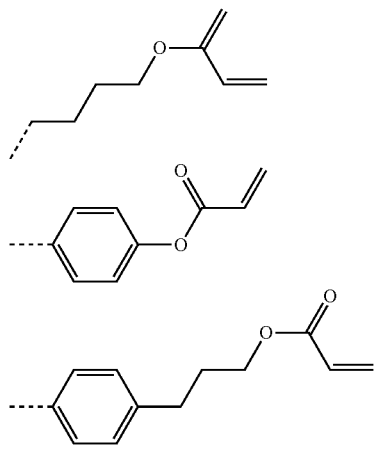

Specific preferred examples of the electrochromic compound represented by the formula (I) include a compound represented by the following formula (II).

Formula (II)

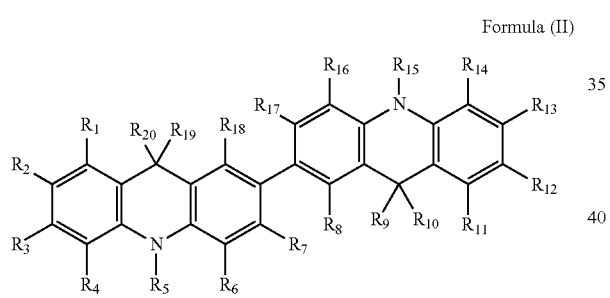

In the formula (II), $R_1$ to $R_{20}$ are the same as those in the formula (I) except that each of $R_2$ and $R_{12}$ independently represents a halogen atom, a monovalent organic group, or a polymerizable functional group.

Preferably, each of $R_2$ and $R_{12}$ is selected from an alkyl group, alkenyl group, alkynyl group, aryl group, heteroaryl group, alkoxy group, aryloxy group, or heteroaryloxy group.

Preferably, at least one of $R_2$ and $R_{12}$ is a halogen atom, a monovalent organic group, or a polymerizable functional group, for inhibiting reaction active sites of the bis(acridan) and improving electric stability.

Because the 3rd and 6th positions of the acridan backbone have high electron density and reactivity, there is a high possibility that unexpected side reactions (e.g., dimerization, cyclization, decomposition) are caused in a redox state. The electrochromic compound according to the present embodiment is stable because the acridan has been dimerized at the 3rd position. When $R_2$ and $R_{12}$ of the acridan backbones are further substituted with the monovalent organic group, electric stability is more improved.

Specific examples of the compounds represented by the formula (I) and (II) are listed below, but are not limited thereto.

Example Compound 1

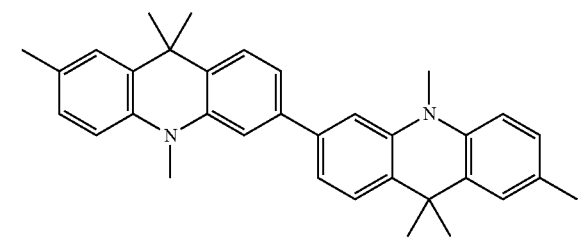

Example Compound 2

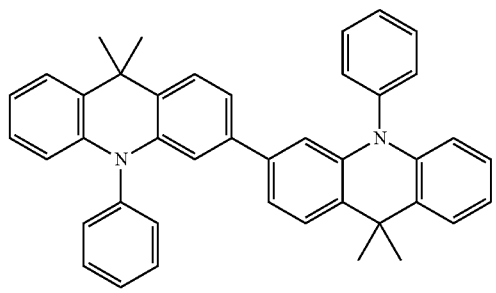

Example Compound 3

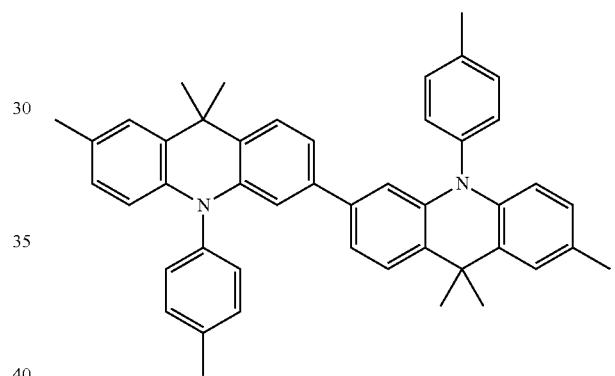

Example Compound 4

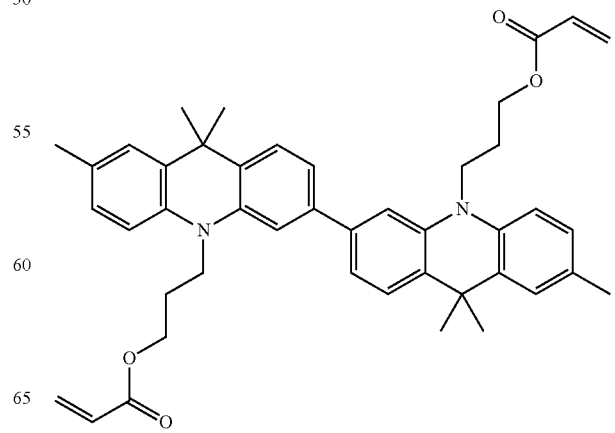

Example Compound 5

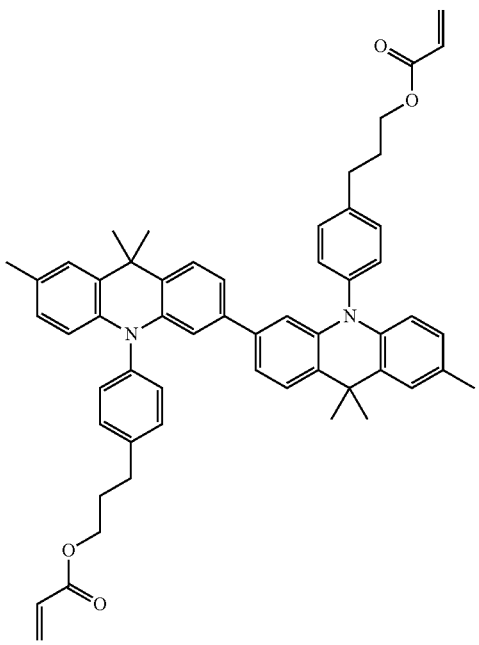

Example Compound 6

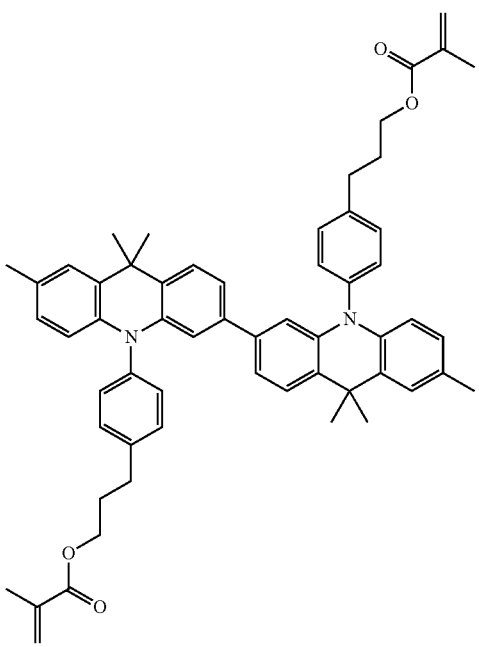

Example Compound 7

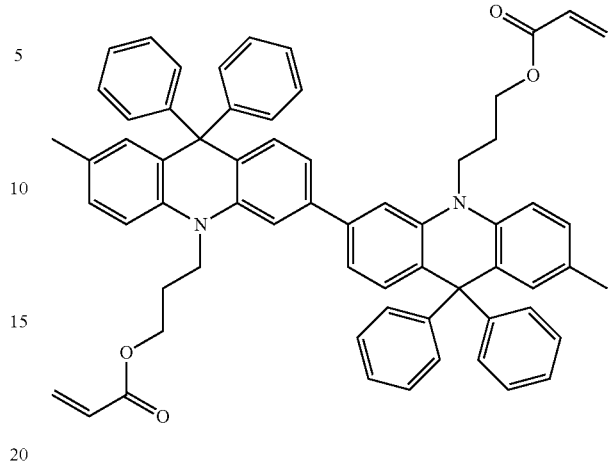

Production Method

The electrochromic compound represented by the formula (I) may be produced by sequentially subjecting a phenyl compound represented by the following formula (V) (one example of halogen compounds) and an amine compound represented by the following formula (VI) to a carbon-nitrogen cross-coupling reaction, in the presence of a metal catalyst (e.g., palladium catalyst, nickel catalyst, copper catalyst), optionally along with a base, in a solvent, in view of availability and toxicity of the materials.

Formula (V)

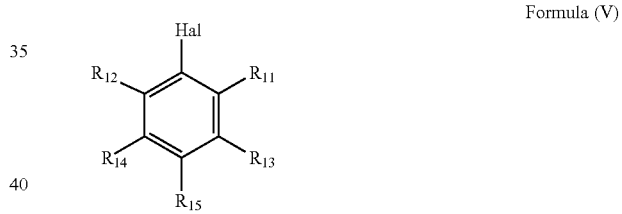

In the formula (V), $R_{11}$ to $R_{15}$ are the same as those in the formula (I), and Hal represents a halogen atom or a triflate group.

Formula (VI)

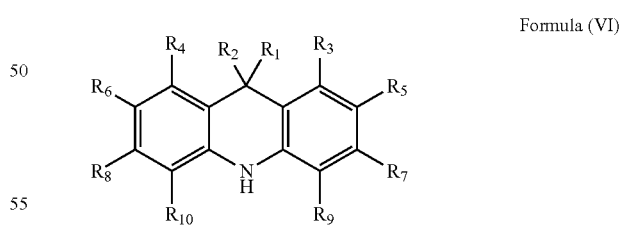

In the formula (VI), $R_1$ to $R_{10}$ are the same as those in the formula (I).

The polymerizable functional group may be previously introduced to an aromatic halogenated compound, a triflate body, or an amine backbone.

Specific examples of the halogen atom include, but are not limited to, chlorine atom, bromine atom, and iodine atom. In particular, chlorine atom and bromine atom are preferable.

Examples of the base include, but are not limited to, strong bases.

Specific examples of the strong bases include, but are not limited to, sodium tert-butoxide, potassium tert-butoxide, potassium carbonate, cesium carbonate, and potassium phosphate.

Specific examples of the solvent include, but are not limited to, toluene, xylene, mesitylene, dioxane, tert-butyl alcohol, tetrahydrofuran, chlorobenzene, o-dichlorobenzene, nitrobenzene, and quinoline.

Specific examples of the catalyst include, but are not limited to, palladium acetate, tris(dibenzylideneacetone)dipalladium, bis(dibenzylideneacetone)palladium, copper, and copper oxide. The catalyst may be combined with a ligand.

Specific examples of the ligand include, but are not limited to: phosphor ligands such as triphenylphosphine, tributylphosphine, and tri-tert-butylphosphine; and nitrogen ligands such as ethylenediamine, cyclohexyldiamine, phenanthroline, and dipyridyl.

The crude product of the electrochromic compound obtained by the above reaction may be refined by any known refining process.

Specific examples of the refining process include, but are not limited to, solvent washing, recrystallization, column chromatography, reprecipitation, and sublimation.

Electrochromic Composition

The electrochromic composition according to an embodiment of the present invention includes the above-described electrochromic compound and another polymerizable compound. Preferably, the electrochromic composition further includes a polymerization initiator. The electrochromic composition may further include other components, if needed.

The electrochromic composition provides an electrochromic element that develops yellow images with high retention property.

Other Polymerizable Compound

The electrochromic composition includes a polymerizable compound (hereinafter "the other radical polymerizable compound") other than the electrochromic compound. The other polymerizable compound has at least one polymerizable functional group.

Specific examples of the other polymerizable compound include, but are not limited to, monofunctional polymerizable compounds, difunctional polymerizable compounds, trifunctional and more-functional polymerizable compounds, functional monomers, and polymerizable oligomers. Among these compounds, trifunctional and more-functional polymerizable compounds are preferable.

Examples of the polymerizable functional group included in the other polymerizable compound include those exemplified for the polymerizable functional group included in the above-described electrochromic compound. In particular, acryloyloxy group and methacryloyloxy group are preferred as the polymerizable functional group.

Specific examples of the monofunctional polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. Each of these compounds can be used alone or in combination with others.

Specific examples of the trifunctional polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

In the above descriptions, "EO-modified" and "PO-modified" represent "ethyleneoxy-modified" and "propyleneoxy-modified", respectively.

Specific examples of the functional monomers include, but are not limited to: fluorine-substituted acrylates and methacrylates (e.g., octafluoropentyl acrylate, 2-perfluorooctylethyl acrylate, 2-perfluorooctylethyl methacrylate, 2-perfluoroisononylethyl acrylate); and polysiloxane-group-containing vinyl monomers having 20 to 70 siloxane repeating units disclosed in JP-05-60503-B and JP-06-45770-B (e.g., acryloyl polydimethylsiloxane ethyl, methacryloyl polydimethylsiloxane ethyl, acryloyl polydimethylsiloxane propyl, acryloyl polydimethylsiloxane butyl, diacryloyl polydimethylsiloxane diethyl). Each of these compounds can be used alone or in combination with others.

Specific examples of the polymerizable oligomers include, but are not limited to, epoxy acrylate oligomers, urethane acrylate oligomers, and polyester acrylate oligomers.

Preferably, at least one of the electrochromic compound and the other polymerizable compound has two or more polymerizable functional groups in view of an effective formation of a cross-lined product.

Preferably, the content rate of the electrochromic compound in the electrochromic composition is in the range of from 10% to 100% by mass, more preferably from 30% to 90% by mass.

When the content rate is 10% by mass or more, the resulting electrochromic layer can express a sufficient electrochromic function, high durability against repeated use under application of voltage, and high color developing sensitivity.

Even when the content rate is 100% by mass, the electrochromic layer can express an electrochromic function. In this case, the color developing sensitivity of the electrochromic layer is high with respect to the thickness thereof. At the same time, by contrast, there may be a case in which the electrochromic layer becomes less compatible with an ionic liquid that is needed for giving and receiving charge, thereby causing deterioration of durability against repeated use under application of voltage and deterioration of electric properties. Although it depends on the process with which the electrochromic layer is to be used, a preferred content rate is in the range of from 30% to 90% by mass in view of an achievement of a balance between color developing sensitivity and durability against repeated use.

Polymerization Initiator

Preferably, the electrochromic composition further includes a polymerization initiator for the purpose of improving a polymerization or cross-linking reaction efficiency between the electrochromic compound and the other polymerizable compound.

Examples of the polymerization initiator include, but are not limited to, thermal polymerization initiators and photopolymerization initiators. From the aspect of polymerization efficiency, photopolymerization initiators are preferable.

Specific examples of the thermal polymerization initiators include, but are not limited to, peroxide initiators (e.g., 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, lauroyl peroxide) and azo initiators (e.g., azobisisobutyronitrile, azobiscyclohexanecarbonitrile, azobis(methyl isobutyrate), azobisisobutyl amidine hydrochloride, 4,4'-azobis-4-cyanovaleric acid). Each of these compounds can be used alone or in combination with others.

Specific examples of the photopolymerization initiators include, but are not limited to, acetophenone or ketal photopolymerization initiators (e.g., diethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl) ketone, 2-benzyl-2-dimethylamino-1-(4-morpholinophenyl)butanone-1, 2-hydroxy-2-methyl-1-phenylpropane-1-one, 2-methyl-2-morpholino(4-methylthiophenyl)propane-1-one, 1-phenyl-1,2-propanedione-2-(o-ethoxycarbonyl)oxime), benzoin ether photopolymerization initiators (e.g., benzoin, benzoin methyl ether, benzoin ethyl ether, benzoin isobutyl ether, benzoin isopropyl ether), benzophenone photopolymerization initiators (e.g., benzophenone, 4-hydroxybenzophenone, methyl o-benzoylbenzoate, 2-benzoyl naphthalene, 4-benzoyl biphenyl, 4-benzoyl phenyl ether, acrylated benzophenone, 1,4-benzoyl benzene), and thioxanthone photopolymerization initiators (e.g., 2-isopropyl thioxanthone, 2-chlorothioxanthone, 2,4-dimethylthioxanthone, 2,4-diethylthioxanthone, 2,4-dichlorothioxanthone).

Specific examples of the photopolymerization initiators further include, but are not limited to, ethylanthraquinone, 2,4,6-trimethylbenzoyldiphenylphosphine oxide, 2,4,6-trimethylbenzoylphenyl ethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these compounds can be used alone or in combination with others.

In addition, a photopolymerization accelerator may be used alone or in combination with the photopolymerization initiator. Specific examples of the photopolymerization accelerator include, but are not limited to, triethanolamine, methyldimethanolamine, ethyl 4-dimethylaminobenzoate, isoamyl 4-dimethylaminobenzoate, (2-dimethylamino)ethyl benzoate, and 4,4'-dimethylaminobenzophenone.

Preferably, the content of the polymerization initiator is in the range of from 0.5 to 40 parts by mass, more preferably from 1 to 20 parts by mass, based on 100 parts by total mass of the electrochromic compound and the other polymerizable compound.

Other Components

The electrochromic composition may further include other components, such as a filler, a solvent, a plasticizer, a leveling agent, a sensitizer, a dispersant, a surfactant, and/or an antioxidant.

Filler

Examples of the filler include organic fillers and inorganic fillers.

Specific examples of the inorganic fillers include, but are not limited to, powders of metals (e.g., copper, tin, aluminum, indium), metal oxides (e.g., silicon oxide (silica), tin oxide, zinc oxide, titanium oxide, aluminum oxide (alumina), zirconium oxide, indium oxide, antimony oxide, bismuth oxide, calcium oxide, antimony-doped tin oxide (ATO), tin-doped indium oxide), and metal fluorides (e.g., tin fluoride, calcium fluoride, and aluminum fluoride). Each of these materials can be used alone or in combination with others. Among these materials, from the aspect of transparency, stability, and ease in surface modification, metal oxides are preferable, and silica, alumina, and antimony-doped tin oxide (ATO) are more preferable.

Specific examples of the organic fillers include, but are not limited to, resins (e.g., polyester, polyether, polysulfide, polyolefin, silicone, polytetrafluoroethylene), low-molecular-weight compounds (e.g., fatty acids), and pigments (e.g., phthalocyanine). Each of these materials can be used alone or in combination with others. Among these materials, from the aspect of transparency and insolubility, resins are preferable.

Preferably, the filler has an average primary particle diameter of 1 m or less, more preferably from 10 nm to 1 m. When the average primary particle diameter of the filler is 1 μm or less, the resulting layer has high surface smoothness since no coarse particle is present.

Preferably, the content of the filler is in the range of from 0.3 to 1.5 parts by mass, more preferably from 0.6 to 0.9 parts by mass, based on 100 parts by total mass of all the polymerizable compounds.

When the content is 0.3 parts by mass or more, filler effect is sufficiently exerted and film formation property is excellent. When the content is 1.5 parts by mass of less, electrochemical properties of the resulting electrochromic element are excellent.

Electrochromic Element

An electrochromic element according to an embodiment of the present invention includes a first electrode, a second electrode, an electrolyte disposed between the first electrode and the second electrode, and the electrochromic compound or electrochromic composition according to an embodiment of the present invention. The electrochromic element may further include other members, if needed.

The electrochromic element may further include an electrochromic layer, disposed on the first electrode, including the electrochromic compound. The electrochromic layer may include two or more electrochromic layers. The electrochromic layer may be disposed on a part of the first electrode. The electrolyte may be in contact with the first electrode, and the electrolyte may include the electrochromic compound.

The electrochromic layer can be formed by a method for producing an electrochromic element to be described later.

Preferably, the electrochromic layer has an average thickness of from 0.1 to 30 km, and more preferably from 0.4 to 10 km.

First Electrode and Second Electrode

The first electrode and the second electrode may be made of a transparent conductive substrate. Specific examples of the transparent conductive substrate include, but are not limited to, a glass or plastic film coated with a transparent conductive thin film.

The transparent conductive thin film may be made of a transparent conductive material. Specific examples of the transparent conductive material include, but are not limited to, inorganic materials such as tin-doped indium oxide (ITO), fluorine-doped tin oxide (FTO), antimony-doped tin oxide (ATO), and zinc oxide. In particular, InSnO, GaZnO, SnO, $In_2O_3$, and ZnO are preferable.

Alternatively, a conductivity-improved transparent electrode, formed of a fine network of transparent carbon nanotube and other highly-conductive non-transmissive materials such as Au, Ag, Pt, and Cu, may be used.

The thicknesses of the first electrode and the second electrode are so adjusted that these electrodes have proper electric resistance values required for causing a redox reaction in the electrochromic layer.

In a case in which the first electrode and the second electrode are made of ITO, preferably, the average thickness thereof is in the range of from 50 to 500 nm.

The first electrode and the second electrode can be formed by vacuum vapor deposition, sputtering, or ion plating.

The first electrode and the second electrode can be coated with any material by a coating method such as spin coating, casting, micro gravure coating, gravure coating, bar coating, roll coating, wire bar coating, dip coating, slit coating, capillary coating, spray coating, nozzle coating, or a printing method such as gravure printing, screen printing, flexo printing, offset printing, reverse printing, and inkjet printing.

Electrolyte

The electrolyte is filled in between the first electrode and the second electrode.

Specific examples of the electrolyte include, but are not limited to: inorganic ion salts such as alkali metal salts and alkali-earth metal salts; quaternary ammonium salts; and supporting salts of acids and bases. More specifically, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$, can be used. Each of these materials can be used alone or in combination with others.

In addition, ionic liquids can also be used as the electrolyte. In particular, organic ionic liquids are preferable because they have a molecular structure that exhibits liquidity in a wide temperature range including room temperature.

Specific examples of cationic components in such organic ionic liquids, that exhibit liquidity in a wide temperature range including room temperature, include, but are not limited to, imidazole derivatives (e.g., N,N-dimethylimidazole salt, N,N-methylethylimidazole salt, N,N-methylpropylimidazole salt), pyridinium derivatives (e.g., N,N-dimethylpyridinium salt, N,N-methylpropylpyridinium salt), and aliphatic quaternary ammonium salts (e.g., trimethylpropylammonium salt, trimethylhexylammonium salt, triethylhexylammonium salt).

From the aspect of stability in the atmosphere, specific preferred examples of anionic components in such organic ionic liquids include, but are not limited to, fluorine-containing compounds such as $BF_4^-$, $CF_3SO_3^-$, $PF_4^-$, and $(CF_3SO_2)_2N^-$. Each of these materials can be used alone or in combination with others.

Ionic liquids which combining the above-described cationic and anionic components are preferably used as the electrolyte.

The ionic liquid may be directly dissolved in a photopolymerizable monomer, an oligomer, or a liquid crystal material. When solubility is poor, the ionic liquid may be first dissolved in a small amount of a solvent, and thereafter mixed with a photopolymerizable monomer, an oligomer, or a liquid crystal material.

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

The electrolyte need not necessarily be a low-viscosity liquid and may be in the form of a gel, cross-linked polymer, or liquid crystal dispersion. Electrolytes in the form of a gel or solid are advantageous in terms of strength and reliability of the element.

Preferably, the electrolyte and the solvent are held in a polymer for reliable fixation.

Specific preferred examples of the polymer include photocurable resins. When the polymer is a photo-curable resin, an electrochromic element can be produced at a lower temperature within a shorter time period, compared to a case in which the polymer is thinned through a thermal polymerization and/or solvent evaporation.

Preferably, an electrolyte layer that contains the electrolyte has an average thickness of from 100 nm to 100 μm.

Other Members

The electrochromic element may further include other members, such as a substrate, a carrier particle, an insulating porous layer, an anti-deterioration layer, and a protective layer.

Substrate The substrate may be made of organic or inorganic transparent materials capable of supporting other layers.

Specific examples of the support include, but are not limited to: glass substrates made of alkali-free glass, borosilicate glass, float glass, or soda-lime glass; and resin substrates made of polycarbonate resin, acrylic resin, polyethylene, polyvinyl chloride, polyester, epoxy resin, melamine resin, phenol resin, polyurethane resin, or polyimide resin.

The substrate may have a surface coating such as a transparent insulating layer, a UV cut layer, and/or an antireflection layer, for improving vapor barrier property, gas barrier property, ultraviolet resistance, and visibility.

The substrate is not limited in shape, and may have a rectangular shape or a circular shape.

The substrate may be a laminated body of multiple materials. As an example, an electrochromic element that is sandwiched by two glass substrates provides improved vapor barrier property and gas barrier property.

Carrier Particle

When the electrochromic compound according to an embodiment of the present invention is combined with another electrochromic material, preferably, a nanostructural carrier particle (hereinafter "nanostructural body") is used.

In a case in which the electrochromic material (other than the electrochromic compound according to an embodiment of the present invention) has phosphonate group, sulfate group, phosphate group, or carboxyl group as a bonding or adsorption structure, the electrochromic material can be easily combined with the nanostructural body, thus forming an electrochromic composition having excellent color developing stability.

The electrochromic material may have multiple phosphonate groups, sulfate groups, phosphate groups, and/or carboxyl groups. In a case in which the electrochromic compound according to an embodiment of the present invention has silyl group or silanol group, the electrochromic compound can be strongly bonded to the nanostructural body via siloxane bonds, thus forming an electrochromic composition having good stability. Siloxane bond is defined as a chemical bond between a silicon atom and an oxygen atom. The electrochromic composition is not limited in bonding structure or configuration so long as it has a configuration in which the electrochromic compound and the nanostructural body are bonded to each other via siloxane bonds.

The nanostructural body may be either a conductive nanostructural body or a semiconductive nanostructural body. Examples of the nanostructural body include nano particles and nanoporous bodies that have nanometer-scale irregularities.

The conductive or semiconductive nanostructural body may be made of a metal oxide in terms of transparency and conductivity.

Specific examples of the metal oxide include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each of these materials can be used alone or in combination with others. From the aspect of electric property (e.g., electric conductivity) and physical property (e.g., optical property), titanium oxide, zinc oxide, tin oxide, zirconium oxide, iron oxide, magnesium oxide, indium oxide, and tungsten oxide are preferred; and titanium oxide is most preferred. When such a metal oxide or a mixture of these oxides is used, a much higher response speed is provided in color development and discharge.

Preferably, the metal oxide is in the form of fine particles having an average primary particle diameter of 30 nm or less. The smaller the average primary particle diameter of the metal oxide, the greater the light transmittance and the surface area per unit volume (hereinafter "specific surface area") of the metal oxide. When having a large specific surface area, the nanostructural body is capable of bearing the electrochromic compound in a more efficient manner, thus providing a multi-color display with an excellent display contrast ratio between color development and discharge. Preferably, the specific surface area of the nanostructural body is 100 $m^2/g$ or more.

Insulating Porous Layer

The insulating porous layer has a function of electrically insulating the first electrode and the second electrode from each other and another function of holding the electrolyte.

The insulating porous layer is made of a porous material. In particular, organic, inorganic, or organic-inorganic composite materials having high insulation property, durability, and film-formation property are preferably used.

The insulating porous layer can be formed by: a sintering method in which polymer fine particles or inorganic particles are partially fused with each other via a binder to form pores between the particles; or an extraction method in which solvent-soluble organic or inorganic substances and solvent-insoluble binders are formed into a layered structure, and the organic or inorganic substances are dissolved with a solvent to form pores; a foaming method; a phase inversion method in which a mixture of polymers is subjected to phase separation by handling a good solvent and a poor solvent; or a radiation irradiation method in which pores are formed by means of radiation.

Anti-Deterioration Layer

The anti-deterioration layer undergoes the reverse reaction of a reaction occurring in the electrochromic layer containing the electrochromic compound or the electrochromic composition, to balance the charges therebetween, so that the first electrode and the second electrode are suppressed from being corroded or deteriorated by the occurrence of an irreversible redox reaction. The reverse reaction includes both a redox reaction of the anti-deterioration layer and an action thereof as a capacitor.

The anti-deterioration layer may include any material having a function of preventing the first electrode and the second electrode from being corroded by an irreversible redox reaction occurring therein. Specific examples of such materials include, but are not limited to, antimony tin oxide, nickel oxide, titanium oxide, zinc oxide, tin oxide, and conductive or semiconductive metal oxides containing two or more of these materials.

The anti-deterioration layer may be made of a porous thin film that does not inhibit injection of the electrolyte. Such a porous thin film having excellent electrolyte permeability and anti-deterioration property can be obtained by, for example, fixing fine particles of a conductive or semiconductive metal oxide (e.g., antimony-tin oxide, nickel oxide, titanium oxide, zinc oxide, tin oxide) on the second electrode with a binder (e.g., acrylic binder, alkyd binder, isocyanate binder, urethane binder, epoxy binder, phenol binder).

Preferably, the above-described conductive or semiconductive nanostructural body carrying the electrochromic compound or the electrochromic composition is used as the anti-deterioration layer, because the process of forming the electrochromic compound or composition layer on the first electrode and that of forming the anti-deterioration layer on the second electrode can be shared in part.

Protective Layer

The protective layer has functions of protecting the electrochromic element from external stress and chemicals used in the washing process, preventing the electrolyte from leaking from the electrochromic element, and preventing the electrochromic element from being intruded by unnecessary substances, such as moisture and oxygen in the air, for its stable operation.

Preferably, the protective layer has an average thickness of from 1 to 200 µm.

The protective layer may include an ultraviolet-curable or heat-curable resin such as acrylic resin, urethane resin, and epoxy resin.

Method for Producing Electrochromic Element

The electrochromic element according to an embodiment of the present invention may be produced by a method including a coating process. In a case in which the electrochromic compound has a polymerizable functional group, preferably, the method further includes a cross-linking process. The method may further include other processes, if needed.

Coating Process

The coating process is for coating the first electrode with a coating liquid including the electrochromic compound or the electrochromic composition.

The coating liquid may be diluted with a solvent, if necessary, before being coated on the first electrode.

Specific examples of the solvent include, but are not limited to, alcohol solvents (e.g., methanol, ethanol, propanol, butanol), ketone solvents (e.g., acetone, methyl ethyl ketone, methyl isobutyl ketone, cyclohexanone), ester solvents (e.g., ethyl acetate, butyl acetate), ether solvents (e.g., tetrahydrofuran, dioxane, propyl ether), halogen solvents (e.g., dichloromethane, dichloroethane, trichloroethane, chlorobenzene), aromatic solvents (e.g., benzene, toluene, xylene), and cellosolve solvents (e.g., methyl cellosolve, ethyl cellosolve, cellosolve acetate). Each of these solvents can be used alone or in combination with others.

The rate of dilution is determined depending on solubility of the coating liquid components, the coating method, and a target thickness of the electrochromic layer.

The coating method may be selected from, for example, dip coating, spray coating, bead coating, and ring coating.

Cross-linking Process

The cross-linking process is for causing a cross-linking reaction in the coating liquid including the electrochromic compound or the electrochromic composition coated on the first electrode by applying thermal or optical energy.

The coating liquid coated on the first electrode is given external energy to be hardened into an electrochromic layer.

The external energy may be selected from, for example, thermal energy, optical energy, or a radial ray.

Thermal energy can be given to the coating liquid coated on the first electrode by heating the coating liquid from the coated-surface side or the opposite substrate-side of the first electrode, using a gaseous substance (e.g., air, nitrogen gas), vapor, a heat medium, infrared ray, or electromagnetic wave.

In this case, preferably, the heating temperature is in the range of from 60° C. to 170° C.

Optical energy can be given to the coating liquid coated on the first electrode from a UV light source having light-emitting wavelengths in the ultraviolet rage, such as a high-pressure mercury lamp and a metal halide lamp, or a visible light source emitting light corresponding to the absorption wavelength of the radical polymerizable compounds or a photopolymerization initiator.

In this case, preferably, the amount of light emission is in the range of from 5 to 15,000 mW/cm$^2$.

Other Processes

The method may further include other processes such as a first electrode forming process, a second electrode forming process, an insulating porous layer forming process, an anti-deterioration layer forming process, a protective layer forming process, and a bonding process.

FIG. 1 is a schematic cross-sectional view of an electrochromic element according to an embodiment of the present invention. As illustrated in FIG. 1, the electrochromic element includes a first electrode 1, a second electrode 2 facing the first electrode 1 with a gap therebetween, and an electrolyte 3 disposed between the first electrode 1 and the second electrode 2. An electrochromic compound 4 according to an embodiment of the present invention is dissolved in the electrolyte 3. In this electrochromic element, the electrochromic compound 4 develops and discharges color by a redox reaction only at the surface of the electrodes.

Use Application

The electrochromic compound and the electrochromic composition according to some embodiments of the present invention have stable operation property and excellent yellow color developing ability, and can be used for, for example, large-size displays such as electrochromic display and stock price display, light control elements such as anti-glare mirror and light control glass, low-voltage driving elements such as touch-panel-type key switch, optical switch, optical memory, electronic paper, and electronic album.

EXAMPLES

Further understanding of the present disclosure can be obtained by reference to certain specific examples provided herein below for the purpose of illustration only and are not intended to be limiting.

Example 1

Synthesis of Electrochromic Compound

An electrochromic compound (Example Compound 5) was synthesized according to the following reaction scheme.

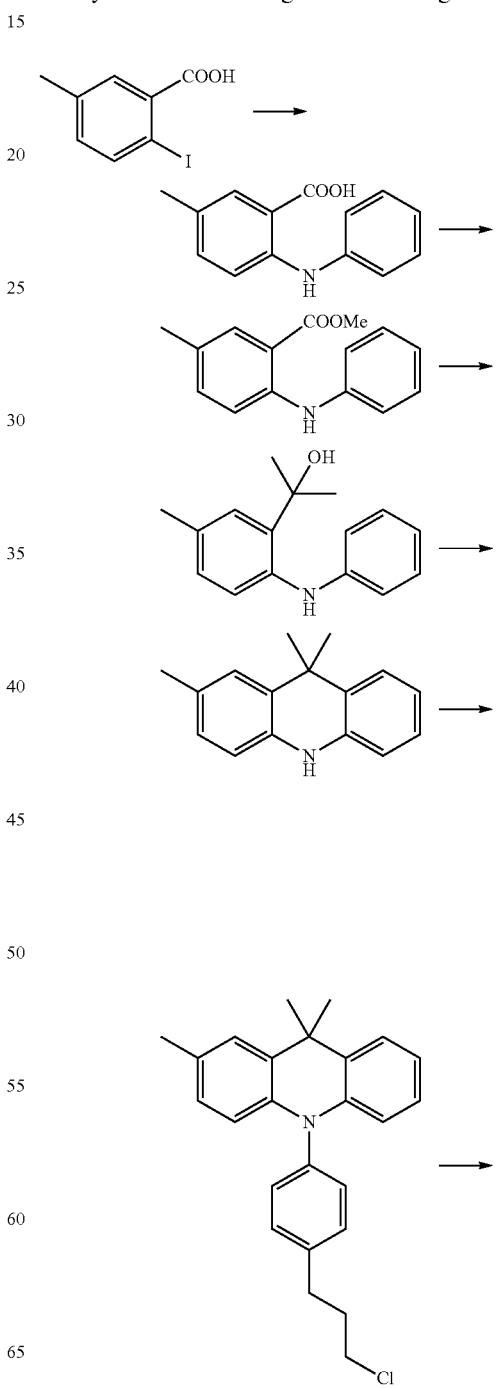

-continued

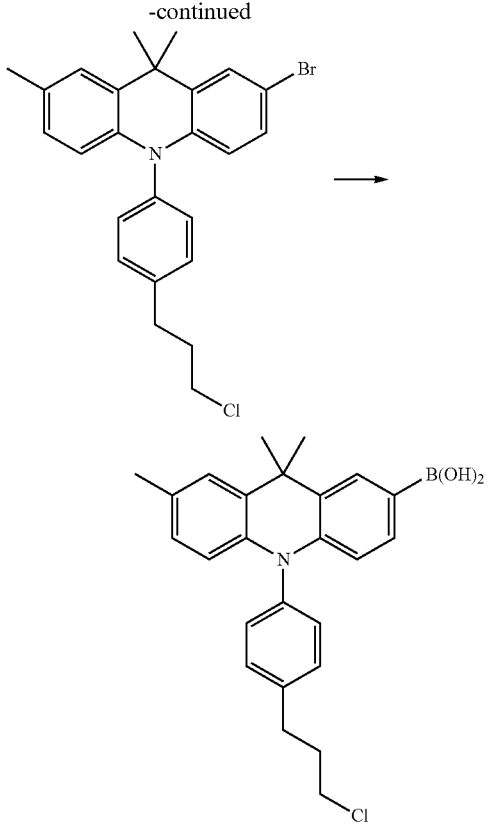

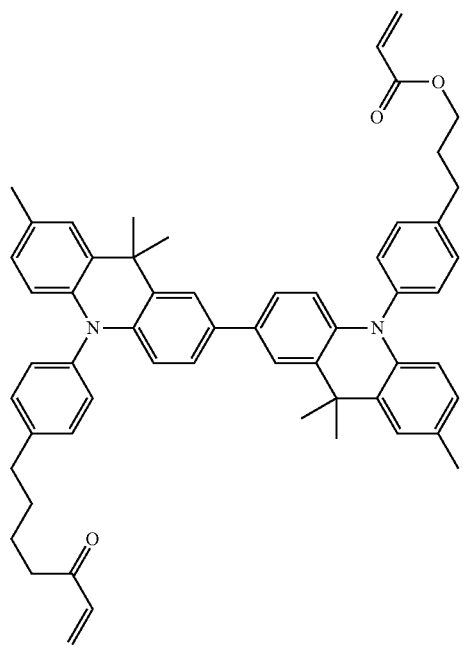

Synthesis of Compound (2)

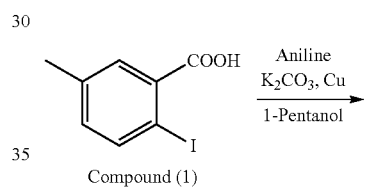

Compound (1)

Compound (2)

In nitrogen atmosphere, a mixture of 285 g (1,090 mmol) of a compound (1), 140 g (1,510 mmol) of aniline, 208 g (1,510 mmol) of potassium carbonate powder, 9.8 g (154 mmol) of copper powder, and 1 L of 1-pentanol was heat-stirred at a reflux temperature for 3 hours. After being allowed to cool, the mixture was condensed under pressures reduced by a vacuum line and thereafter a vacuum pump. The condensation residue was mixed with water and concentrated hydrochloric acid so that the pH thereof became 6. The resulting suspension liquid was further mixed with 2 L of ethyl acetate and filtered with Celite® (product of Celite Corporation). The residue remaining on the filter was washed with 1.5 L of ethyl acetate for 3 times. The filtrate was subjected to liquid separation. The separated organic phase was dried with anhydrous sodium sulfate and thereafter condensed under reduced pressures. The condensed residue was mixed with hexane and filtered. The residue remaining on the filter was washed and thereafter dried under reduced pressures. Thus, 156.6 g (689 mmol) of a compound (2) in a white solid state was obtained (at a yield of 63.2%).

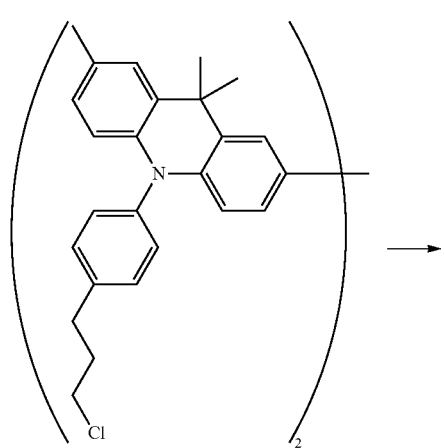

Synthesis of Compound (3)

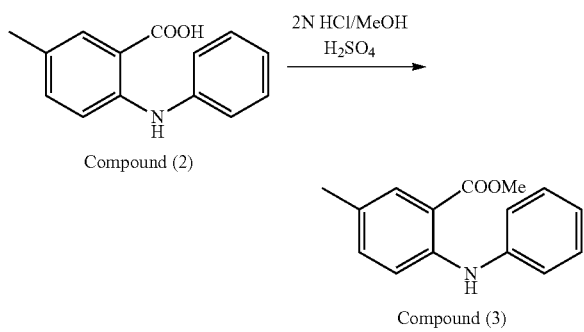

In nitrogen atmosphere, a mixture of 156.6 g (689 mmol) of the compound (2) and 2.8 liters of 2N HCl/methanol solution was heat-stirred at a reflux temperature for 12 hours. After adjusting the inner temperature to 60° C. or less and mixing 12.4 g (124 mmol) of concentrated sulfuric acid therein, the mixture was heat-stirred at a reflux temperature for 6 hours. After adjusting the inner temperature to 60° C. or less again and mixing 6.4 g (164 mmol) of concentrated sulfuric acid therein, the mixture was heat-stirred at a reflux temperature for 6 hours. After being allowed to cool, the mixture was further stirred along with 16.2 g (192.8 mmol) of sodium hydrogen carbonate and thereafter condensed under reduced pressures. The condensation residue was mixed with 1.5 L of water and 1.5 mL of ethyl acetate to cause extraction and liquid separation. The water phase was extracted by the ethyl acetate. The combined organic phase was washed with saturated sodium bicarbonate water and saturated salt water, and dried with anhydrous sodium sulfate, followed by a condensation under reduced pressures. The condensation residue was purified by a silica gel column chromatography. Thus, 148.4 g (615 mmol) of a compound (3) was obtained (at a yield of 89.2%).

Synthesis of Compound (4)

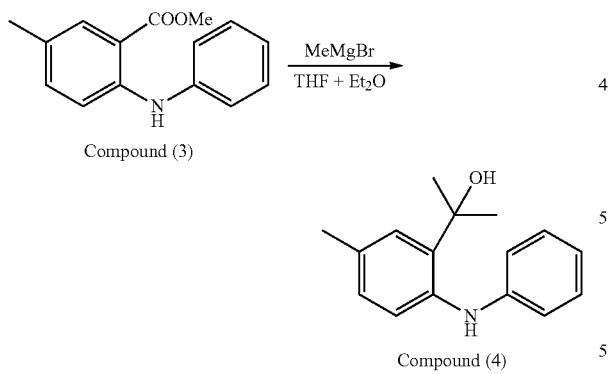

In nitrogen atmosphere, 2 L of a THF (tetrahydrofuran) anhydride solution dissolving 148.4 g (615 mmol) of the compound (3) was cooled to 0° C., and 756 mL (2.26 mol) of a 3M methylmagnesium bromide/diethyl ether solution was dropped therein at an inner temperature of 5° C. The mixture was gently heated to room temperature and stirred overnight. The mixture was cooled in an ice bath, and 1.4 L of a saturated ammonium chloride aqueous solution was dropped therein. The mixture was extracted by 1.5 L of ethyl acetate to cause liquid separation. The water phase was extracted by the 1.5 L of ethyl acetate. The combined organic phase was washed with saturated salt water and dried with anhydrous magnesium sulfate, followed by a condensation under reduced pressures. The condensation residue was purified by a silica gel column chromatography (hexane/ethyl acetate=9/1 by volume). Thus, 142.1 g (589 mmol) of a compound (4) was obtained (at a yield of 95.8%).

Synthesis of Compound (5)

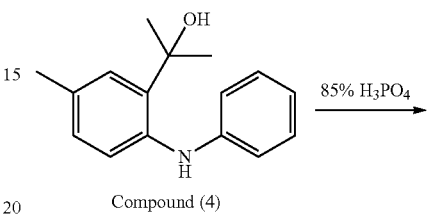

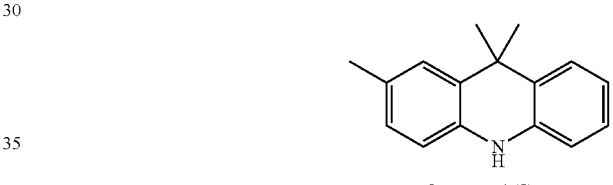

In nitrogen atmosphere, a mixture of 142.1 g (589 mmol) of the compound (4) and 2 L of a 85% by mass aqueous solution of phosphoric acid was heat-stirred at 35° C. for 2 hours. The mixture was poured into 5 L of ice water, stirred for 15 minutes, and filtered. After being washed with water 5 times, the residue remaining on the filter was dissolved in 2.5 L of ethyl acetate and washed with 1.5 L of saturated sodium bicarbonate water. The water phase was extracted by the 2.5 L of ethyl acetate. The combined organic phase was condensed under reduced pressures. Thus, 129.8 g (581 mmol) of a compound (5) in a white solid state was obtained (at a yield of 98.6%).

Synthesis of Compound (6)

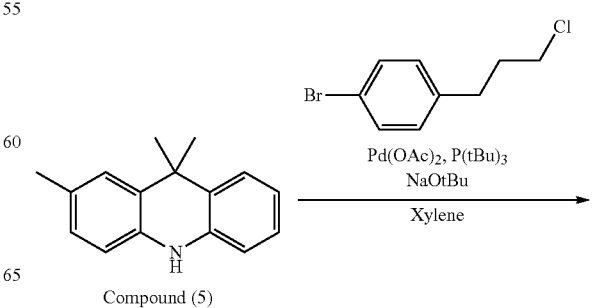

-continued

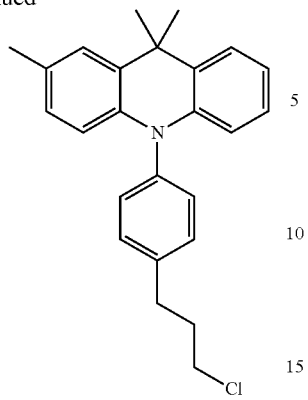

Compound (6)

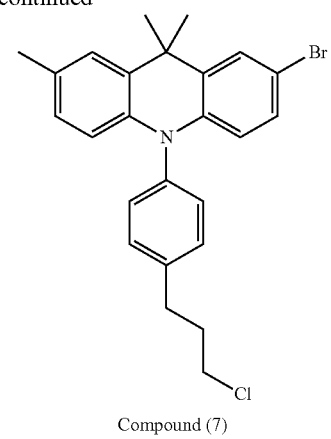

Compound (7)

In nitrogen atmosphere, a mixture of 129.8 g (581 mmol) of the compound (5), 135.7 g (581 mmol) of 4-(3-chloropropyl)bromobenzene, 1.30 g (5.81 mmol) of palladium acetate, 83.8 g (872 mmol) of t-butoxysodium, and 2 L of toluene was stirred while being bubbled with nitrogen for 30 minutes. The mixture was thereafter heated to 70° C., and 40 mL of a toluene solution of 5.19 g (17.4 mmol) of tri-tert-butylphosphine was mixed therein. The mixture was then heat-stirred at an inner temperature of 115° C. for 2 hours. After being allowed to cool, the mixture was filtered with Celite® (product of Celite Corporation) and washed with toluene. The washings were condensed under reduced pressures. The condensation residue was purified by a silica gel column chromatography (hexane/toluene=6/1 by volume). Thus, 191.3 g (509 mmol) of a compound (6) was obtained (at a yield of 87.5%).

Synthesis of Compound (7)

In nitrogen atmosphere, 4 L of a DMF (dimethylformamide) solution of 191.3 g (209 mmol) of the compound (6) was cooled to −10° C., and 92.4 g (509 mmol) of NBS (N-bromosuccinimide) was mixed therein little by little. The mixture was then stirred at room temperature for 6 hours. The mixture was diluted with 8 L of water and 8 L of ethyl acetate to cause extraction and liquid separation. The organic phase was washed with a 5% by mass aqueous solution of sodium thiosulfate and thereafter saturated salt water, and dried with anhydrous sodium sulfate, followed by a condensation under reduced pressures. The condensation residue was purified by a silica gel column chromatography (hexane/toluene=4/1 by volume). Thus, 220.4 g (485 mmol) of a compound (7) was obtained (at a yield of 95.3%).

Synthesis of Compound (8)

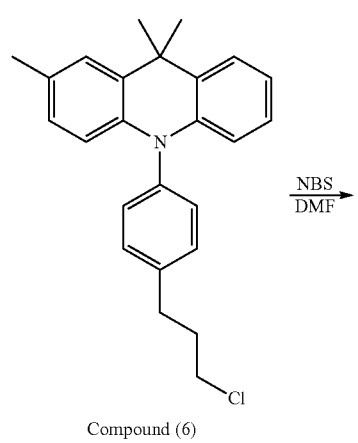

Compound (6)

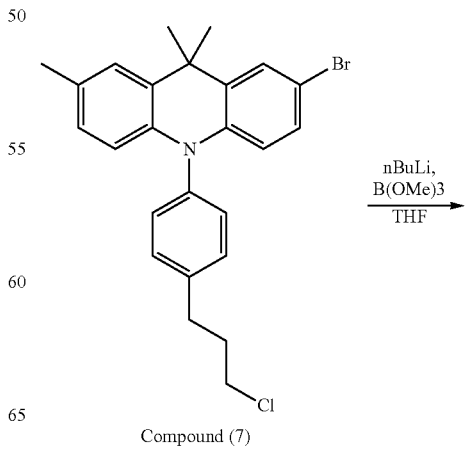

Compound (7)

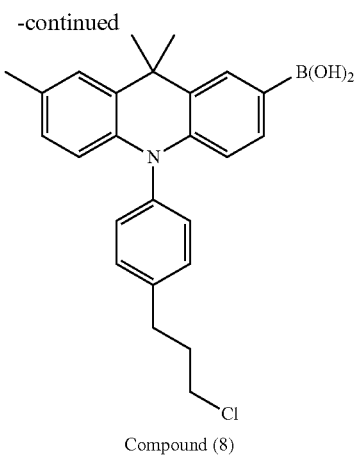

Compound (8)

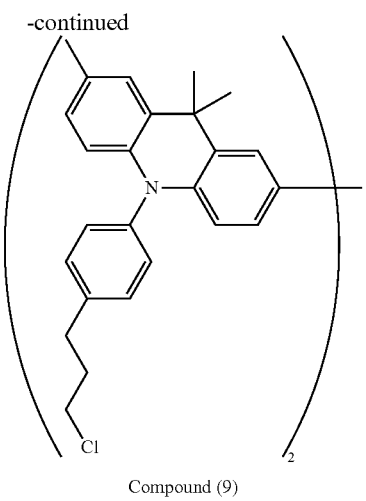

Compound (9)

In nitrogen atmosphere, while 1 L of a dry THF solution of 110.2 g (242 mmol) of the compound (7) was being cooled to −65° C., 104 mL (276 mmol) of 2.65M n-butyllithium hexane solution was dropped therein. The mixture was stirred at the same temperature for 1 hour, and thereafter 36 mL (306 mmol) of trimethyl borate was dropped therein at −65° C. or less. The mixture was further stirred for 2 hours, thereafter heated to room temperature over a period of 1 hour and stirred overnight. The mixture was cooled to 0° C., and 280 mL of 1N hydrochloric acid was dropped therein. The mixture was diluted with 900 mL of ethyl acetate to cause extraction and liquid separation. The organic phase was dried with anhydrous sodium sulfate and thereafter condensed under reduced pressures. Thus, 102 g (245 mmol) of a compound (8) was obtained (at a yield of 100%).

In nitrogen atmosphere, while a mixture liquid of 110.2 g (240 mmol) of the compound (7), 100.7 g (240 mmol) of the compound (8), 25.4 g (240. mmol) of sodium carbonate, 800 mL of 1,4-dioxane, 800 mL of toluene, and 1.1 L of water was being bubbled with nitrogen, 2.8 g (2.4 mmol) of Pd(PPh$_3$)$_4$ and 1.46 g (4.8 mmol) of tri-tolylphosphine were mixed therein. The inner temperature was heated to 70° C. and the nitrogen bubbling was stopped thereafter. The mixture was further heated to 80° C. while remaining in the nitrogen atmosphere and stirred overnight at the same temperature. After being allowed to cool, the mixture was filtered with Celite® (product of Celite Corporation), and the residue remaining on the filter was washed with toluene. The filtrate was subjected to liquid separation, and the water phase was extracted by ethyl acetate. The combined organic phase was washed with saturated salt water and dried with anhydrous sodium sulfate, followed by a condensation under reduced pressures. The condensation residue was purified by a silica gel column chromatography (hexane/toluene=3/2 by volume). Thus, 69.2 g (92.2 mmol) of a compound (9) was obtained (at a yield of 38.4%).

Synthesis of Electrochromic Compound (Example Compound 5)

Synthesis of Compound (9)

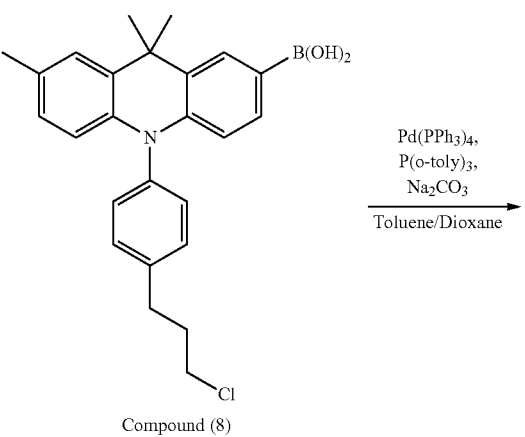

Compound (8)

Pd(PPh$_3$)$_4$,
P(o-toly)$_3$,
Na$_2$CO$_3$
———————→
Toluene/Dioxane

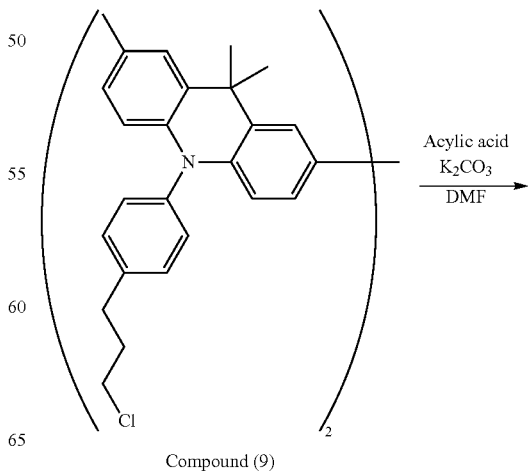

Compound (9)

Acylic acid
K$_2$CO$_3$
—————→
DMF

-continued

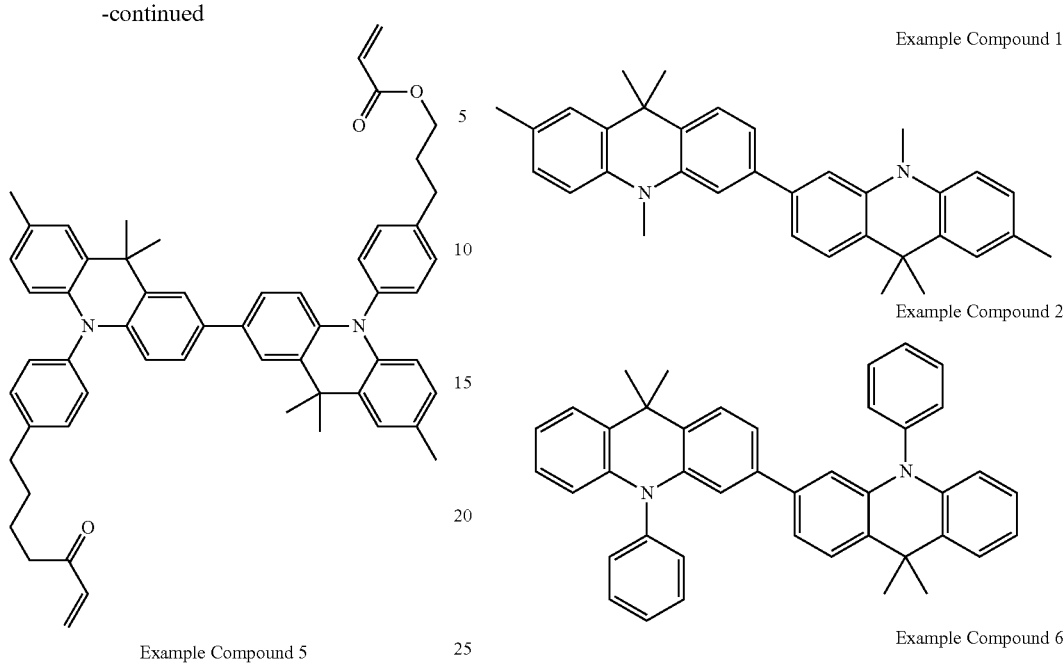

Example Compound 5

In nitrogen atmosphere, a mixture of 69.2 g (92.2 mmol) of the compound (9), 33.2 g (461 mmol) of acrylic acid, 600 mL of DMF, and 38.3 g (277 mmol) of potassium carbonate was heated to 80° C.-90° C. for 24 hours. After the mixture had been cooled, 1 L of ethyl acetate and 600 mL of water were mixed therein, and the mixture was subjected to stirring and liquid separation. The organic phase was washed with 1 L of saturated salt water 5 times, dried with anhydrous sodium sulfate, and condensed under reduced pressures at a bath temperature of 30° C. or less. The condensation residue was purified by a silica gel column chromatography (hexane/toluene/ethyl acetate=42/8/50 by volume). The collected target fraction was mixed with 50 mg of BHT (dibutylhydroxytoluene) and condensed. The condensation residue was mixed with 500 mL of hexane to deposit crystals. The crystals were collected as a filter residue and a cake of the filter residue was washed with a mixture liquid of 400 mL of hexane and 600 mL of ethyl acetate, followed by drying under reduced pressures. Thus, 57.3 g (69.8 mmol) of an electrochromic compound (Example Compound 5) in a white solid state was obtained (at a yield of 75.7%).

Examples 2-4

Synthesis of Electrochromic Compound

The following electrochromic compounds, i.e., Example Compound 1 (bis(acridan) compound), Example Compound 2 (bis(acridan) compound), and Example Compound 6 (bis(acridan) compound), were synthesized in a similar manner as Example Compound 5 was synthesized in Example 1.

Example 5

Preparation of Electrochromic Element
Formation of Anti-Deterioration Layer on Electrode
An ITO glass (having an area of 40 mm×40 mm, a thickness of 0.7 mm, and an ITO film thickness of about 100 nm) was prepared as a first electrode.
Another ITO glass substrate (having an area of 40 mm×40 mm, a thickness of 0.7 mm, and an ITO film thickness of about 100 nm) was prepared as a second electrode. The second electrode was coated with a titanium oxide nano particle dispersion liquid (SP210 available from Showa Titanium Co., Ltd., having an average particle diameter of about 20 nm) by spin coating and subjected to an annealing treatment at 120° C. for 15 minutes. Thus, a nanostructural semiconductive material made of a titanium oxide particle film having a thickness of 1.0 μm was formed on the second electrode.

The first electrode and the second electrode were bonded to each other through both ends thereof, with a piece of double-sided adhesive tape (having an area of 40 mm×1 mm and a thickness of 0.08 mm), so as to face with each other and to have a lead portion. Thus, a blank element was prepared.

Electrolyte Liquid Filling

An electrolyte liquid having the following composition was prepared.

Electrochromic compound (Example Compound 1, bis(acridan) compound): 50 parts by mass
Propylene carbonate: 1,000 parts by mass
1-Ethyl-3-methylimidazolium tetracyanoborate (available from Merk KGaA): 50 parts by mass The electrolyte liquid was injected into the blank element with a micro pipette. The outer periphery of the blank element was sealed with PHOTOLEC A-780 (available from Sekisui Chemical Co., Ltd.). Thus, an electrochromic element was prepared.

Example 6

Preparation of Electrochromic Element

The procedure in Example 5 was repeated except for replacing the electrochromic compound (Example Compound 1, bis(acridan) compound) included in the electrolyte liquid with another electrochromic compound (Example Compound 2, bis(acridan) compound).

Example 7

Preparation of Electrochromic Element
Formation of Electrochromic Layer on First Electrode To form an electrochromic layer on a first electrode, an electrochromic composition containing the materials listed below was prepared.

Composition
Electrochromic compound (Example Compound 5, bis(acridan) compound): 50 parts by mass
TRGACURE 184 (available from BASF Japan Ltd.): 5 parts by mass
PEG400 Diacrylate containing a difunctional acrylate (available from Nippon Kayaku Co., Ltd.): 50 parts by mass
Methyl ethyl ketone: 900 parts by mass An ITO glass substrate (having an area of 40 mm×40 mm, a thickness of 0.7 mm, and an ITO film thickness of about 100 nm) was prepared as a first substrate. The first electrode was coated with the electrochromic composition by spin coating. The coating layer was exposed to ultraviolet ray emitted from an UV emitter (SPOT CURE available from Ushio Inc.) at 10 mW for 60 seconds, and then subjected to an annealing treatment at 60° C. for 10 minutes. Thus, a cross-linked electrochromic layer having an average thickness of 400 μm was formed.

Formation of Anti-Deterioration Layer on Second Electrode

Another ITO glass substrate (having an area of 40 mm×40 mm, a thickness of 0.7 mm, and an ITO film thickness of about 100 nm) was prepared as a second electrode. The second electrode was coated with a titanium oxide nano particle dispersion liquid (SP210 available from Showa Titanium Co., Ltd., having an average particle diameter of about 20 nm) by spin coating and subjected to an annealing treatment at 120° C. for 15 minutes. Thus, a nanostructural semiconductive material made of a titanium oxide particle film having an average thickness of 1.0 μm was formed on the second electrode.

Electrolyte Filling

An electrolyte liquid having the following composition was prepared.

IRGACURE 184 (available from BASF Japan Ltd.): 5 parts by mass
PEG400 Diacrylate containing a difunctional acrylate (available from Nippon Kayaku Co., Ltd.): 100 parts by mass
1-Ethyl-3-methylimidazolium tetracyanoborate (available from Merk KGaA): 50 parts by mass The above-prepared electrolyte liquid in an amount of 30 mg was weighed with a micro pipette and dropped onto the anti-deterioration layer on the ITO glass substrate.

Further, the two ITO glass substrates (i.e., the first electrode and the second electrode) were bonded to each other, such that the cross-linked electrochromic layer faced the anti-deterioration layer and each electrode has a lead portion.

The bonded element was exposed to ultraviolet light (having a wavelength of 250 nm) emitted from a UV emitter (SPOT CURE available from Ushio Inc.) at 10 mW for 60 seconds. Thus, an electrochromic element was prepared.

Example 8

Preparation of Electrochromic Element

The procedure in Example 7 was repeated except for replacing the electrochromic compound (Example Compound 5, bis(acridan) compound) included in the electrochromic layer on the first electrode with another electrochromic compound (Example Compound 6, bis(acridan) compound).

Comparative Example 1

Preparation of Electrochromic Element

The procedure in Example 5 was repeated except for replacing the electrochromic compound (Example Compound 1, bis(acridan) compound) with a compound (VII) having the following formula.

Compound (VII)

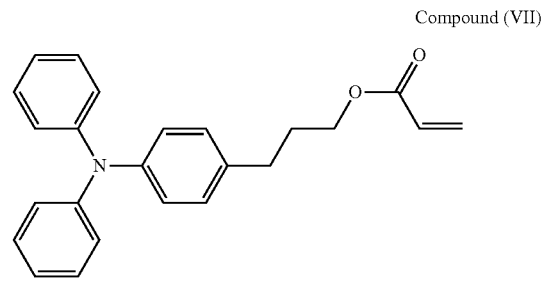 [SMILES: C=CC(=O)OCCCc1ccc(N(c2ccccc2)c2ccccc2)cc1]

Comparative Example 2

Preparation of Electrochromic Element

The procedure in Example 5 was repeated except for replacing the electrochromic compound (Example Compound 1, bis(acridan) compound) with a compound (VIII) having the following formula.

Compound (VIII)

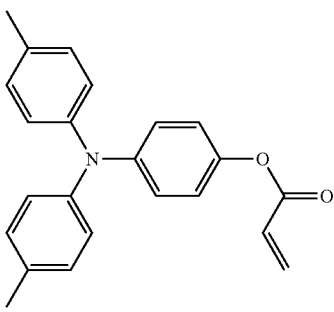

The electrochromic elements prepared in Examples 5-8 and Comparative Examples 1-2 were subjected to evaluations of color-development and color-discharge driving, color, and repetition durability. The results are shown in Table 1.

Evaluation of Color-Development and Color-Discharge Driving/Evaluation of Color

Color-development and color-discharge property of each electrochromic element was evaluated as follows. First, a voltage of −2 V was applied to between the lead portions of the first electrode and the second electrode. As a result, in Examples 5-8, yellow color development was observed in the overlap portion where the first electrode and the second electrode were overlapped. In Comparative Examples 1-2, blue color development was observed.

Next, a voltage of +2 V was applied to between the lead portions of the first electrode and the second electrode. As a result, in Examples 5-8, the overlap portion where the first electrode and the second electrode were overlapped discharged color and became transparent.

Figure 2:
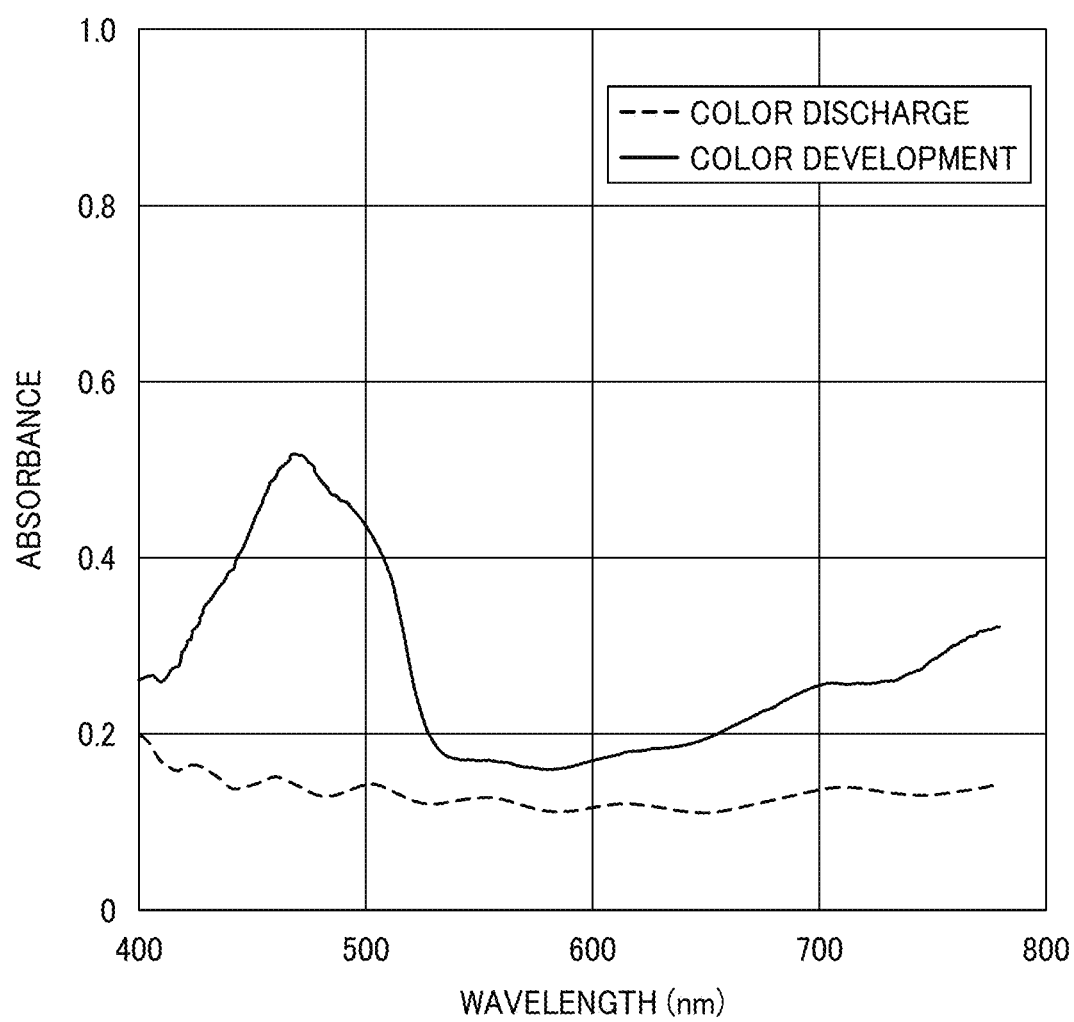
FIG. 2 is a graph showing absorption spectra of an electrochromic element according to an embodiment of the present invention.

Absorption spectra of the electrochromic element of Example 5 in color-development and color-discharge states, measured with a spectrometer USB4000 (available from Ocean Optics, Inc.), are shown in FIG. 2.

Evaluation of Repetition Durability

Each electrochromic element was repeatedly subjected to a color-development and color-discharge driving cycle 500 times, in which a voltage of −2 V was applied 5 seconds and a voltage of +2 V was applied 5 seconds. A wavelength (λmax) at which the local maximum absorbance was observed within a visible range (400-800 nm) was 470 nm. A change in absorbance at λmax (470 nm) was measured with a spectrometer USB4000 (available from Ocean Optics, Inc.) and evaluated based on the following criteria.

Evaluation Criteria

A: The absorbance at λmax was 90% or more of the initial absorbance.

B: The absorbance at λmax was less than 90% but not less than 80% of the initial absorbance.

C: The absorbance at λmax was less than 80% but not less than 50% of the initial absorbance.

D: The absorbance at λmax was less than 50% of the initial absorbance.

TABLE 1

|  |  | Electrochromic Compounds | Color | Repetition Durability |
|---|---|---|---|---|
| Examples | 5 | Example Compound 1 | Yellow | A |
|  | 6 | Example Compound 2 | Yellow | A |
|  | 7 | Example Compound 5 | Yellow | A |
|  | 8 | Example Compound 6 | Yellow | B |

TABLE 1-continued

|  |  | Electrochromic Compounds | Color | Repetition Durability |
|---|---|---|---|---|
| Comparative Examples | 1 | Compound (VII) | Blue | D |
|  | 2 | Compound (VIII) | Blue | C |

It is clear from Table 1 that the electrochromic compounds according to some embodiments of the present invention used in Examples 5-8 have good yellow color development property and repetition durability.

By contrast, the conventional electrochromic compounds used in Comparative Examples 1-2 provide neither desired color nor satisfactory repetition durability.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic compound of Formula (I):

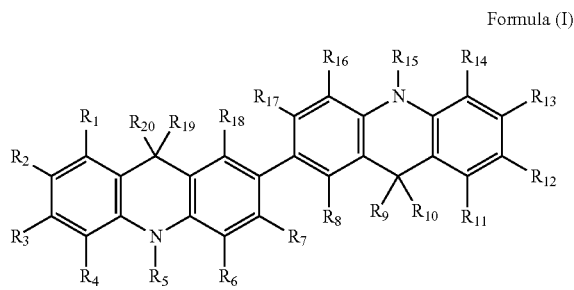

Formula (I)

wherein $R_1$ to $R_8$ and $R_{11}$ to $R_{18}$ are each independently a hydrogen atom, a halogen atom, an optionally substituted monovalent organic group, or a polymerizable functional group of Formula (i) or Formula (ii); and $R_9$, $R_{10}$, $R_{19}$, and $R_{20}$ are each independently a hydrogen atom, an alkyl group, or an aryl group;

$$CH_2=CH-X_1- \quad \quad \text{Formula (i)}$$

wherein $X_1$ is a substituted or unsubstituted arylene group, a substituted or unsubstituted alkenylene group, —CO—, —COO—, or —CON($R_{100}$)— where $R_{100}$ is a hydrogen atom, an alkyl group, an aralkyl group, or an aryl group), $$CH_2=C(Y)-X_2- \quad \quad \text{Formula (ii)}$$

wherein Y is a substituted or unsubstituted alkyl group, a substituted or unsubstituted aralkyl group, a substituted or unsubstituted aryl group, a halogen atom, cyano group, nitro group, an alkoxy group, or —COOR$_{101}$ where $R_{101}$ is a hydrogen atom, a substituted or unsubstituted alkyl group, a substituted or unsubstituted aralkyl group, a substituted or unsubstituted aryl group, or CONR$_{102}$R$_{103}$ wherein $R_{102}$ and $R_{103}$ are each independently a hydrogen atom, a substituted or unsubstituted alkyl group, a substituted or unsubstituted aralkyl group, or a substituted or unsubstituted aryl group, $X_2$ is a substituted or unsubstituted arylene group, a substituted or unsubstituted alkenylene group, —CO—, —COO—, or —CON($R_{100}$)— where $R_{100}$ is a hydrogen atom, an alkyl group, an aralkyl group, or an aryl group, and at least one of Y and $X_2$ is an oxycarbonyl group, cyano group, an alkenylene group or an aromatic ring, and at least one of $R_1$ to $R_8$ and $R_{11}$ to $R_{18}$ is a polymerizable functional group of Formula (i) or Formula (ii).

2. The electrochromic compound of claim 1, wherein at least one of $R_5$ and $R_{15}$ is the polymerizable functional group of Formula (i) or Formula (ii).

3. The electrochromic compound of claim 1, wherein at least one of $R_1$ to $R_8$ and $R_{11}$ to $R_{18}$ is an optionally substituted monovalent organic group and the monovalent organic group is selected from the group consisting of alkyl groups, alkenyl groups, alkynyl groups, aryl groups, heteroaryl groups, alkoxy groups, aryloxy groups, and heteroaryloxy groups.

4. The electrochromic compound of claim 1, wherein each of $R_2$ and $R_{12}$ is selected from the group consisting of alkyl groups, alkenyl groups, alkynyl groups, aryl groups, heteroaryl groups, alkoxy groups, aryloxy groups, and heteroaryloxy groups.

5. The electrochromic compound of claim 1, wherein the polymerizable functional group is of formula (i) and $X_1$ has a structure including at least one member selected from the group consisting of alkyl groups, aryl groups, and alkyl-group-substituted aryl groups, or the polymerizable functional group is of formula (ii) and $X_2$ has a structure including at least one member selected from the group consisting of alkyl groups, aryl groups, and alkyl-group-substituted aryl groups.

6. The electrochromic compound of claim 1, wherein the polymerizable functional group according to Formulae (i) or (ii) is acryloyloxy group or methacryloyloxy group.

7. An electrochromic composition comprising:
the electrochromic compound of claim 1; and
a polymerizable compound.

8. An electrochromic element comprising:
a first electrode;
a second electrode;
an electrolyte disposed between the first electrode and the second electrode; and
the electrochromic compound of claim 1.

9. The electrochromic element of claim 8, further comprising an electrochromic layer disposed on the first electrode, the electrochromic layer including the electrochromic compound.

10. The electrochromic element of claim 9, wherein the electrochromic layer includes two or more electrochromic layers.

11. The electrochromic element of claim 9, wherein the electrochromic layer is disposed on a part of the first electrode.

12. The electrochromic element of claim 8, wherein the electrolyte is in contact with the first electrode, and the electrolyte includes the electrochromic compound.

* * * * *